(12) United States Patent
Gilbert et al.

(10) Patent No.: US 9,043,218 B2
(45) Date of Patent: *May 26, 2015

(54) RULE COMPLIANCE USING A CONFIGURATION DATABASE

(75) Inventors: Allen M. Gilbert, Austin, TX (US); David L. Kaminsky, Chapel Hill, NC (US); A. Steven Krantz, Sherman Oaks, CA (US)

(73) Assignee: International Business Machines Corporation, Armonk, NY (US)

(*) Notice: Subject to any disclaimer, the term of this patent is extended or adjusted under 35 U.S.C. 154(b) by 2659 days.

This patent is subject to a terminal disclaimer.

(21) Appl. No.: 11/451,073

(22) Filed: Jun. 12, 2006

(65) Prior Publication Data

US 2007/0288281 A1    Dec. 13, 2007

(51) Int. Cl.
| | |
|---|---|
| *H04L 29/06* | (2006.01) |
| *G06Q 10/06* | (2012.01) |
| *G06F 21/60* | (2013.01) |
| *G06Q 50/18* | (2012.01) |

(52) U.S. Cl.
CPC .............. *H04L 63/20* (2013.01); *G06Q 10/063* (2013.01); *G06F 21/604* (2013.01); *G06Q 50/188* (2013.01)

(58) Field of Classification Search
CPC ................................................... G06Q 10/063
USPC ..................................................... 705/7, 7.11
See application file for complete search history.

(56) References Cited

U.S. PATENT DOCUMENTS

| | | | |
|---|---|---|---|
| 5,133,063 A | 7/1992 | Naito et al. | |
| 7,552,145 B1* | 6/2009 | Errigo et al. | 1/1 |
| 7,610,304 B2 | 10/2009 | Jain et al. | |
| 2002/0069367 A1 | 6/2002 | Tindal et al. | |
| 2002/0103575 A1 | 8/2002 | Sugawara | |
| 2004/0030923 A1 | 2/2004 | Tindal et al. | |
| 2004/0243699 A1* | 12/2004 | Koclanes et al. | 709/224 |
| 2005/0102505 A1 | 5/2005 | Chung et al. | |
| 2006/0004875 A1 | 1/2006 | Baron et al. | |
| 2006/0015841 A1* | 1/2006 | Bishop et al. | 717/102 |
| 2006/0143177 A1 | 6/2006 | Idicula et al. | |
| 2006/0161879 A1* | 7/2006 | Lubrecht et al. | 717/101 |
| 2006/0277080 A1* | 12/2006 | DeMartine et al. | 705/7 |
| 2006/0293942 A1* | 12/2006 | Chaddha et al. | 705/8 |

(Continued)

FOREIGN PATENT DOCUMENTS

WO    2004021107 A2    3/2004

OTHER PUBLICATIONS

U.S. Appl. No. 11/451,023: Final Office Action Dated Aug. 11, 2011.

(Continued)

*Primary Examiner* — Susanna M Meinecke Diaz
(74) *Attorney, Agent, or Firm* — Law Office of Jim Boice

(57) ABSTRACT

A Configuration Management DataBase (CMDB) is utilized to cause resources, which are modeled in and managed by the CMDB, to be in compliance with a newly implemented resource rule. In one embodiment, a computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system.

20 Claims, 8 Drawing Sheets

(56) References Cited

U.S. PATENT DOCUMENTS

| | | | |
|---|---|---|---|
| 2007/0005774 A1* | 1/2007 | Singh et al. | 709/227 |
| 2007/0061191 A1* | 3/2007 | Mehrotra et al. | 705/11 |
| 2007/0100892 A1* | 5/2007 | Kephart et al. | 707/200 |
| 2007/0239700 A1* | 10/2007 | Ramachandran | 707/5 |
| 2007/0288281 A1* | 12/2007 | Gilbert et al. | 705/8 |
| 2007/0288925 A1* | 12/2007 | Hughes et al. | 718/100 |

OTHER PUBLICATIONS

D. Dubie, "IBM Introduces Configuration Mgmt. Software", Network World, vol. 22, No. 20, May 23, 2005, pp. 29 & 32.

E. Scannell, "Tivoli Automates IT Processes", Infoworld, vol. 27, No. 21, May 23, 2005, pp. 23.

Anonymous, "Cendura Supports IBM's IT Service Management Solutions", marketwired.com, Marketwire LP, May 17, 2005, pp. 1-3.

D. Neel, "IBM to Ease Middleware Integration With New Tivoli Tool", informationweek.com, UBM Electronics, May 17, 2005, pp. 1-2.

U.S. Appl. No. 11/451,023—Requirement for Information Under 37 CFR 1.105, mailed Nov. 15, 2010.

U.S. Appl. No. 11/451,023—Examiner's Answer Mailed Feb. 29, 2012.

* cited by examiner

RULE COMPLIANCE USING A CONFIGURATION DATABASE

BACKGROUND OF THE INVENTION

The present invention relates in general to the field of computers and other data processing systems, including hardware, software and processes. More particularly, the present invention pertains to the management of the resources of such a system using rules and/or policies.

Enterprise behavior is governed by policies that, in some cases, are translated into rules to be used by computing resources (which may include both hardware and software resources). For example, an enterprise may have an enterprise policy (e.g., a corporate policy) that dictates that passwords used by computing resources must be "strong" (difficult to bypass or "break"). Such a policy may translate into a "rule," such as the rule that "passwords must be eight characters." A difficulty lies in how to ensure that such computing resources actually incorporate the use of a new rule. There is also a difficulty in certifying, to an enterprise's Information Systems (IS) manager, which computing resources have actually implemented the new rule.

SUMMARY OF THE INVENTION

To address the problem described above, a Configuration Management DataBase (CMDB) is utilized to cause resources, which are modeled in and managed by the CMDB, to be in compliance with a newly implemented resource rule. Thus, in one embodiment of a computer-implementable method, system and computer-usable medium, the computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

A Configuration Management Database (CMDB) is a unified repository of information. An exemplary CMDB, as modified by and used in the present invention, is also capable of utilizing and/or storing other data such as rules and policies related to all resources in an Information System (IS), particularly those managed by the CMDB. As such, the CMDB allows an enterprise to understand relationships between resources (including both IS hardware and software) and to track their configuration. Included in the CMDB are Configuration Items (CI) and details about relationships between CIs. A CI is defined as an instance of a resource that has configurable attributes, such as hardware resources (e.g., storage devices, servers, routers, etc.) as well as software resources (applications, databases, etc.). Note that in a traditional prior-art CMDB, the CMDB only reflects the configuration of resources, and does not include logic for implementing (forcing) attribute rules in resources (as taught by the present invention).

Thus, as described herein, the present invention extends the CMDB to include the ability to cause a resource to automatically implement a new rule, which reflects a change to a rule for an attribute of that resource. The rule change may be enforced on one or more resources, as determined by the CMDB. Note that while in one embodiment, the CMDB directly changes a rule for an attribute, in another embodiment a resource (including a computer program) that has access to the CMDB may use the CMDB in the manner described herein to change the rule for an attribute (of any resource that is managed by the CMDB).

Figure 1:
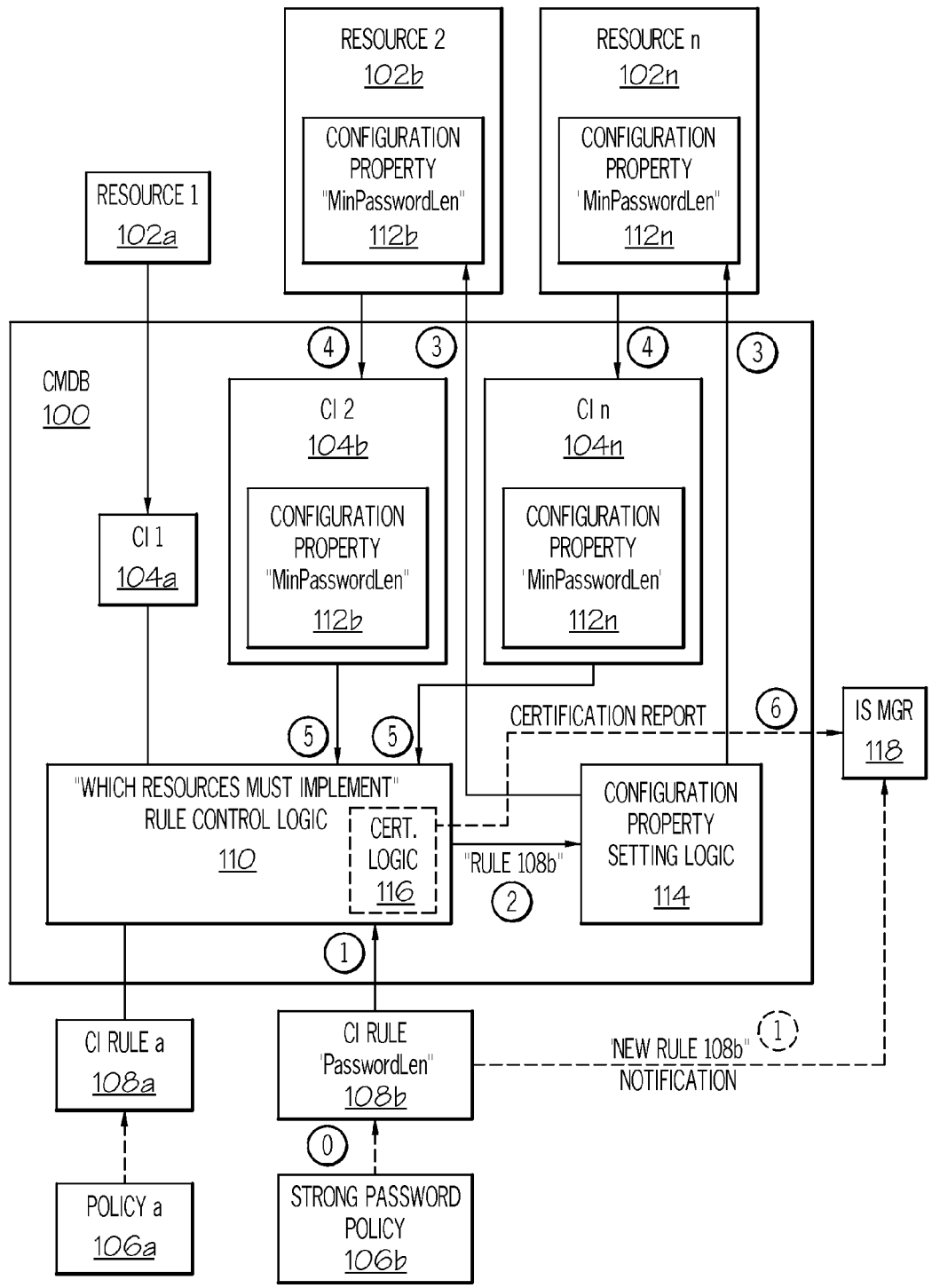
FIG. 1 depicts an exemplary Configuration Management Database (CMDB) that has been modified by the present invention, thus permitting centralized changes to attributes of resources that are managed by the CMDB.

With reference now to the figures, and in particular to FIG. 1, an exemplary Configuration Management Database (CMDB) 100, having novel modifications that are contemplated by the present invention, is presented. CMDB 100 manages multiple resources 102a-n, which are software and hardware computer resources in an enterprise's data processing system, which may be a network (virtual or actual), a stand-alone computer, or any other similar computing system. Each resource 102 has a corresponding Configuration Item (CI) 104a-n, each of which provides a description of attributes of a particular resource 102. These attributes include, but are not limited to, security requirements, addresses, and other configuration items for a particular resource.

Consider now, for exemplary purposes, a resource attribute that is related to how long a password should be for a user to access that resource. This resource attribute is described by a CI rule 108. There may be multiple CI rules 108, including the shown CI rules 108a-b. Each CI rule may be linked to a policy 106, such as the depicted policies 106a-b. For example, assume that CI rule 108b is a rule for a minimum password length ("PasswordLen"). This rule may be changed in response to a change in an enterprise policy 106b, which states that certain or all resources 102 in the enterprise must have a "Strong Password" to permit access to that resource. Note that policy 106 is merely an enterprise directive, while CI rule 108 creates an actual rule that can be understood by a resource and/or the CMDB 100.

Referring again to FIG. 1, a CI rule 108 may be passed (step "1") to a rule control logic 110, which controls, inter alia, which resources 102 must implement a particular CI rule 108. For example, rule control logic 110 may determine (e.g., via a lookup table contained within rule control logic 110), that Resource 2 (102b) and Resource n (102n) must both implement CI rule 108b, which requires a password to use a password that exceeds a particular length (e.g., eight characters). Upon notification that a CI rule 108 has changed (resulting in a new rule), rule control logic 110 then sends (step "2") a notification to a configuration property setting logic 114 of the new rule. For example, assume that CI rule 108b represents a new rule requiring long (e.g., over eight characters) passwords to be used by a resource 102. If the affected resources are Resource 2 (102b) and Resource n (102n), configuration property setting logic 114 sends (steps "3") a message (e.g., a data packet with instructions) to a configuration property 112 found in Resource 102b (112b) and Resource 102n (112n). Thus, the new attribute rule reflecting the change to "PasswordLen" is automatically set in the configuration property "MinPasswordLen". Note that the names and references to "PasswordLen" and "MinPasswordLen" need not be the same.

After implementing the new rule, each affected resource 102 shadows back (steps "4") its updated attributes, including the configuration properties 112, to their respective CI 104. These updated configuration properties are read (steps "5") by certification logic 116 in the rule control logic 110. Certification logic 116 "knows" which resources are to implement the new attribute (CI) rule 108 in the appropriate configuration property 112. As such, certification logic 116 is able to generate and transmit (step "6") a certification report for an enterprise's Information Systems (IS) manager 118. Optionally, a "heads up" message may be sent (step "1") to the IS manager 118 at the same time the new CI rule 108b is sent to the rule control logic 110, thus letting the IS manger know to watch for a certification report of which resources are (and should be) compliant with the new attribute rule. Note that the IS manager 118 may either be an a CMDB manager who directly manages resources that are described in the CMDB 100, or the IS manager 118 may be an external (third party) actor who uses CMDB 100 to get data from and manage resources described in the CMDB 100. Note that the new rule generated in CI rule 108b may be in response to a change to an enterprise policy 106b (step "0"). This new rule may be a change to CI rule 108b, or the new rule may be an initial creation/implementation of CI rule 108b.

Figure 2:
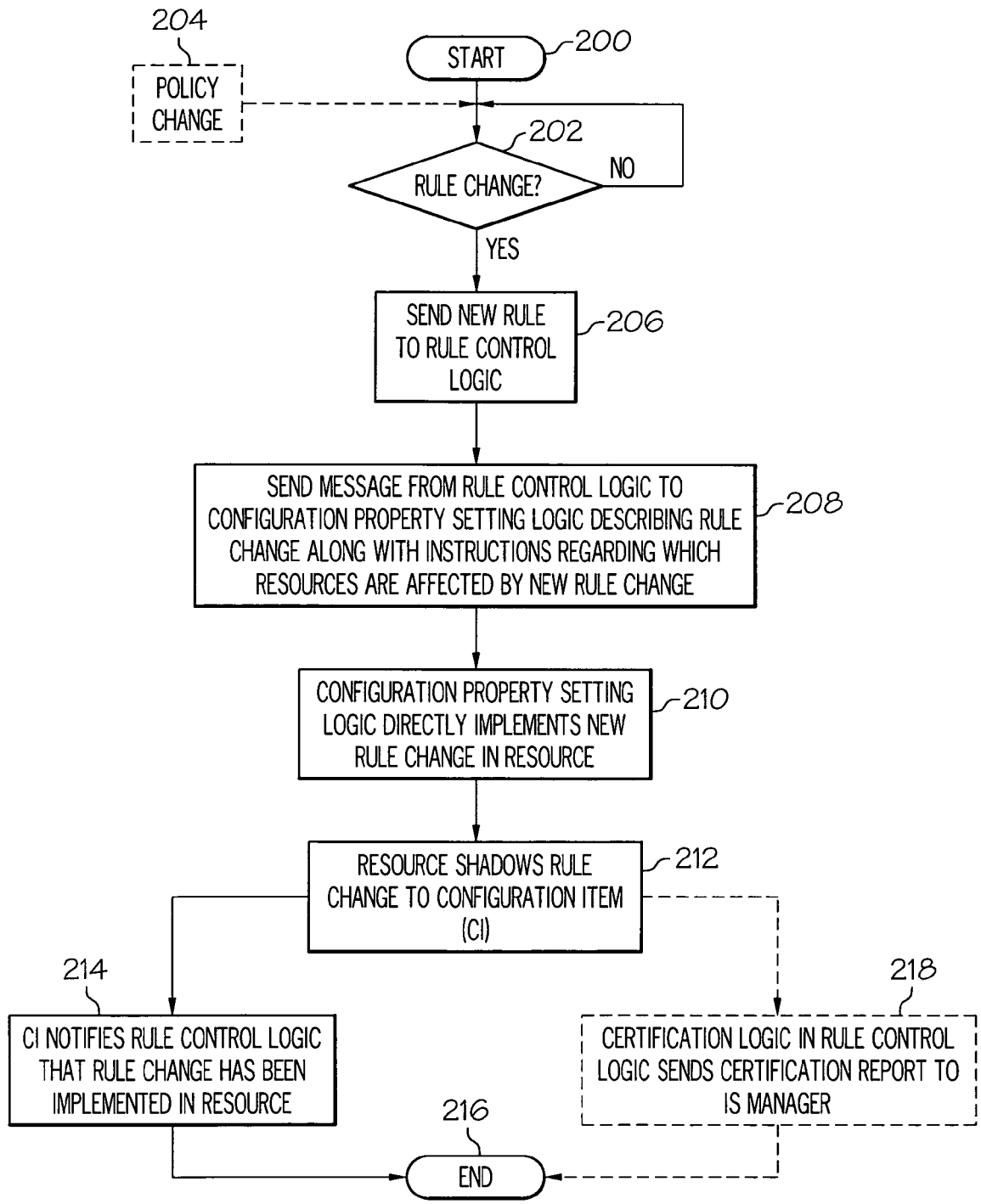
FIG. 2 is a flow-chart showing exemplary steps taken in the present invention implement attribute changes to resources that are managed by the CMDB, and to determine if those enterprise resources are in compliance with one or more CI rules and/or their associated enterprise policies.

With reference now to FIG. 2, a flow-chart describing the steps reference in FIG. 1 (whose components are again reference herein) is presented. After initiator block 200, a query is made (query block 202) to determine if a CI rule has changed, resulting in a new rule for an attribute of a resource. This rule change may have been the result of a change (block 204) to an enterprise policy 106, as described in FIG. 1. If a CI rule has changed, then the new rule is sent to the rule control logic (block 206), which sends a message (block 208) to a configuration property setting logic 114 that automatically sets a configuration property 112 in an appropriate resource 102. Note that this message not only describes the rule change for specific attributes of the resources, but also includes instructions to reset the configuration property for particularly specified resources. The configuration property setting logic 114 directly implements the new rule in the configuration property setting in the appropriate resources (block 210). The affected resources shadow back their configuration settings, which include evidence of the new rule being implemented therein, to their respective CI's (block 212). The affected CI's send a notification to certification logic in the rule control logic that one or more resources have implemented the new rule (block 214). Optionally, the certification logic may send a certification report to an IS manager, thus informing the CI manager which resources are and are not compliant with the new rule (block 218). The process ends at terminator block 216.

While the present invention has been thus described as changing a rule that describes an attribute of a resource, in another embodiment the attribute of the resource may be directly changed. That is, a rule (e.g., "PasswordLen>7") may be distributed as described above, or alternatively, the attribute itself (e.g., "MinPasswordLen=8") may be transmitted to the resource. Depending on the computer system, some Information Technology (IT) managers will express this property of the resource as the rule "PasswordLen>7" while other IT managers will express the feature as the attribute "MinPasswordLen=8". Similarly, some resources will store this property as a configuration setting. For example, in a Windows® environment, this configuration setting may be stated as "MinPasswrdLen=8". Alternatively, other systems may use a more flexible form, in which a callout is made to a rules engine asking "validateNewPassword(newPassword)", where "newpassword" may be a string. Such a function may apply a number of rules, such as "password cannot be all letters" and/or "password length must be greater than 7 characters." Thus, the present invention contemplates not only sending rules (as described in exemplary manner), but also directly sending and implementing the attribute itself.

Figure 3:
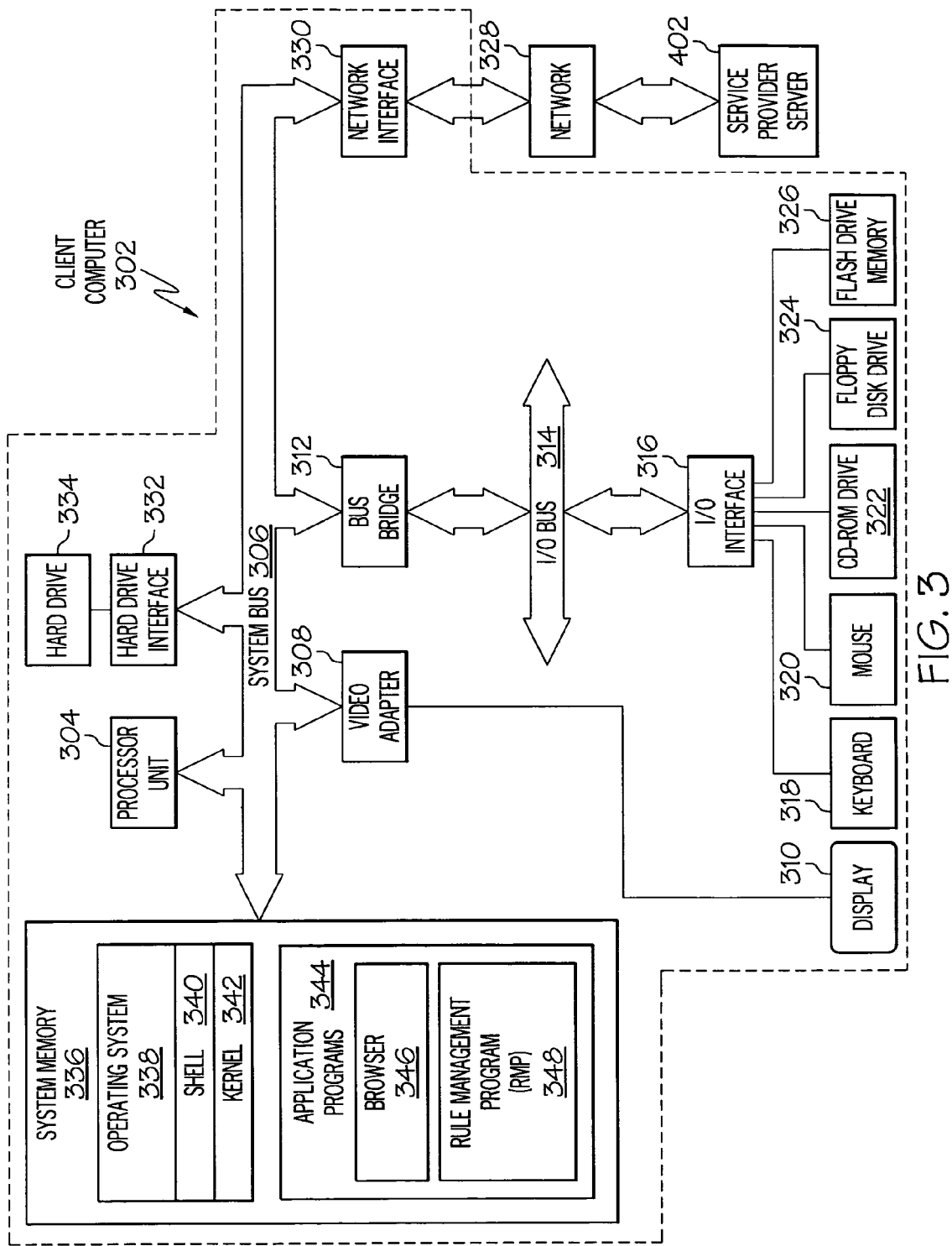
FIG. 3 depicts an exemplary client computer in which the present invention may implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk—Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN). Using network 328, client computer 302 is able to use the present invention to access service provider server 402.

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a Rule Management Program (RMP) 348, which includes code for implementing the processes described in FIGS. 1-2. In one embodiment, client computer 302 is able to download RMP 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
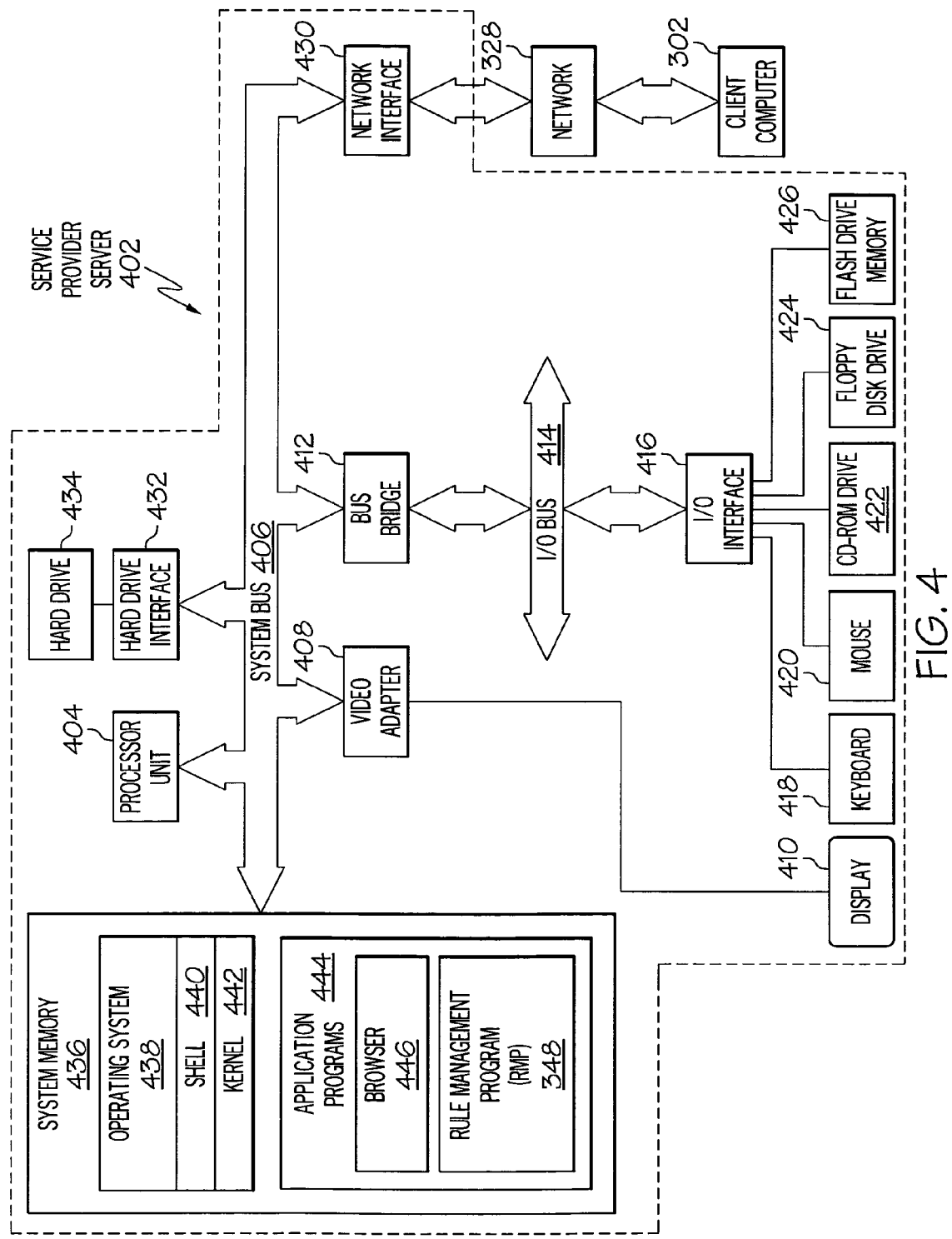
FIG. 4 illustrates an exemplary server from which software for executing the present invention may be deployed and/or implemented for the benefit of a user of the client computer shown in FIG. 3.

As noted above, RMP 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk—Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to execute and/or download RMP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of RMP 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of RMP 348), thus freeing client computer 302 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of RMP 348, are performed by service provider server 402. Alternatively, RMP 348 and the method described herein, and in particular as shown and described in FIGS. 1-2, can be deployed as a process software from service provider server 402 to client computer 302. Still more particularly, process software for the method so described may be deployed to service provider server 402 by another service provider server (not shown).

Figure 5A:
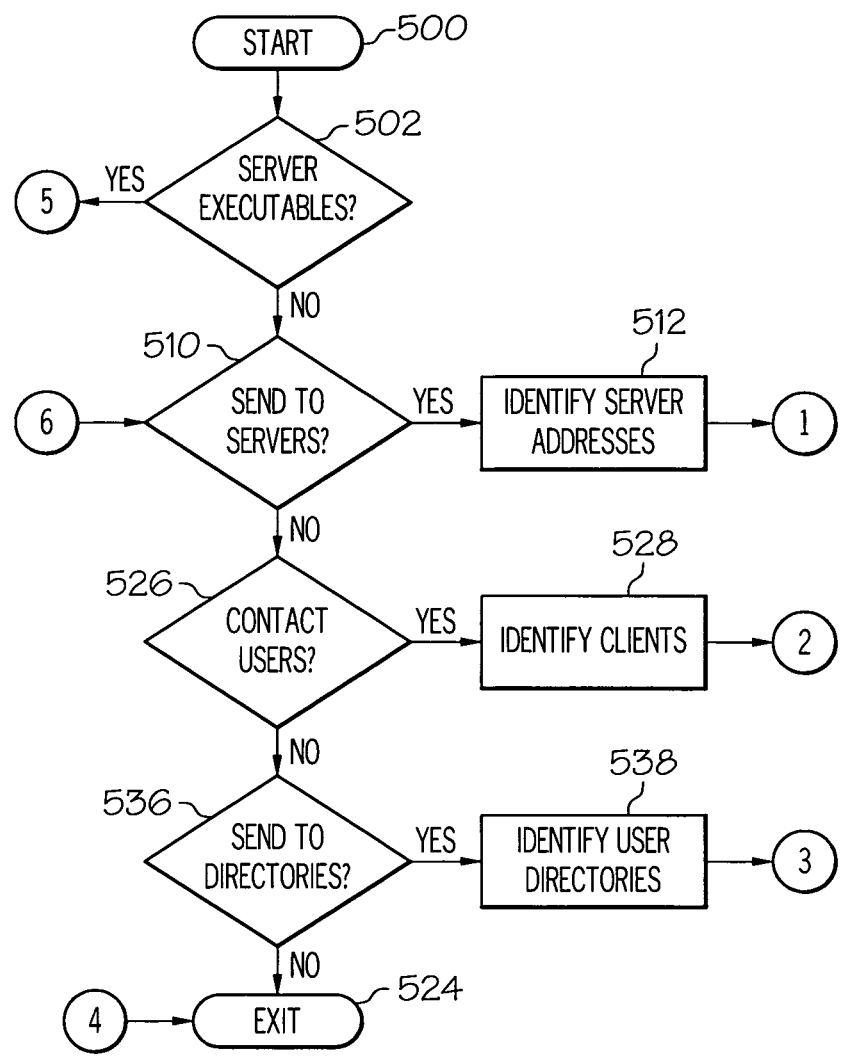
FIGS. 5a-b show a flow-chart of steps taken to deploy software capable of executing the steps shown and described in FIGS. 1-2.
Figure 5B:
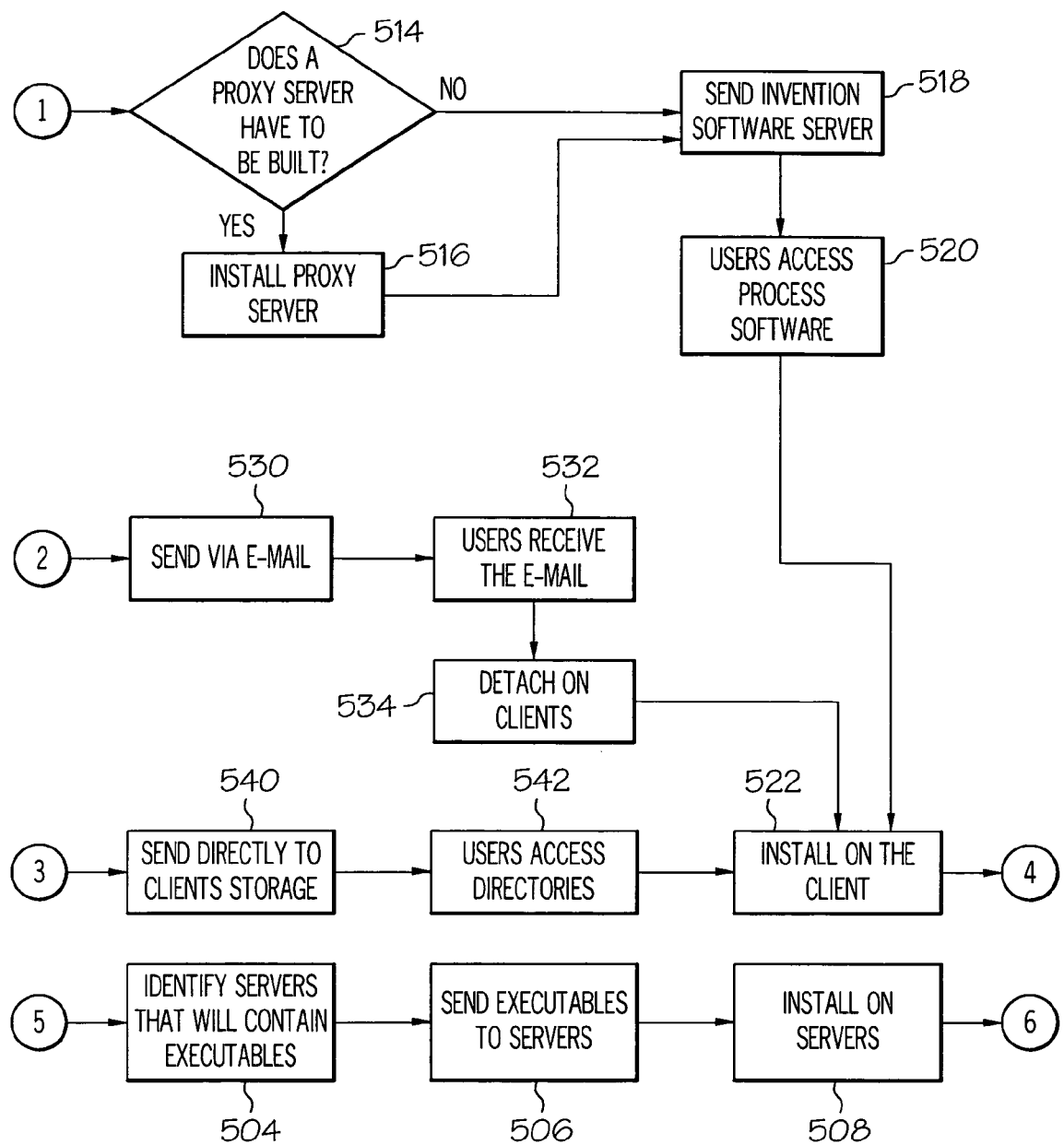

Referring then to FIGS. 5a-b, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
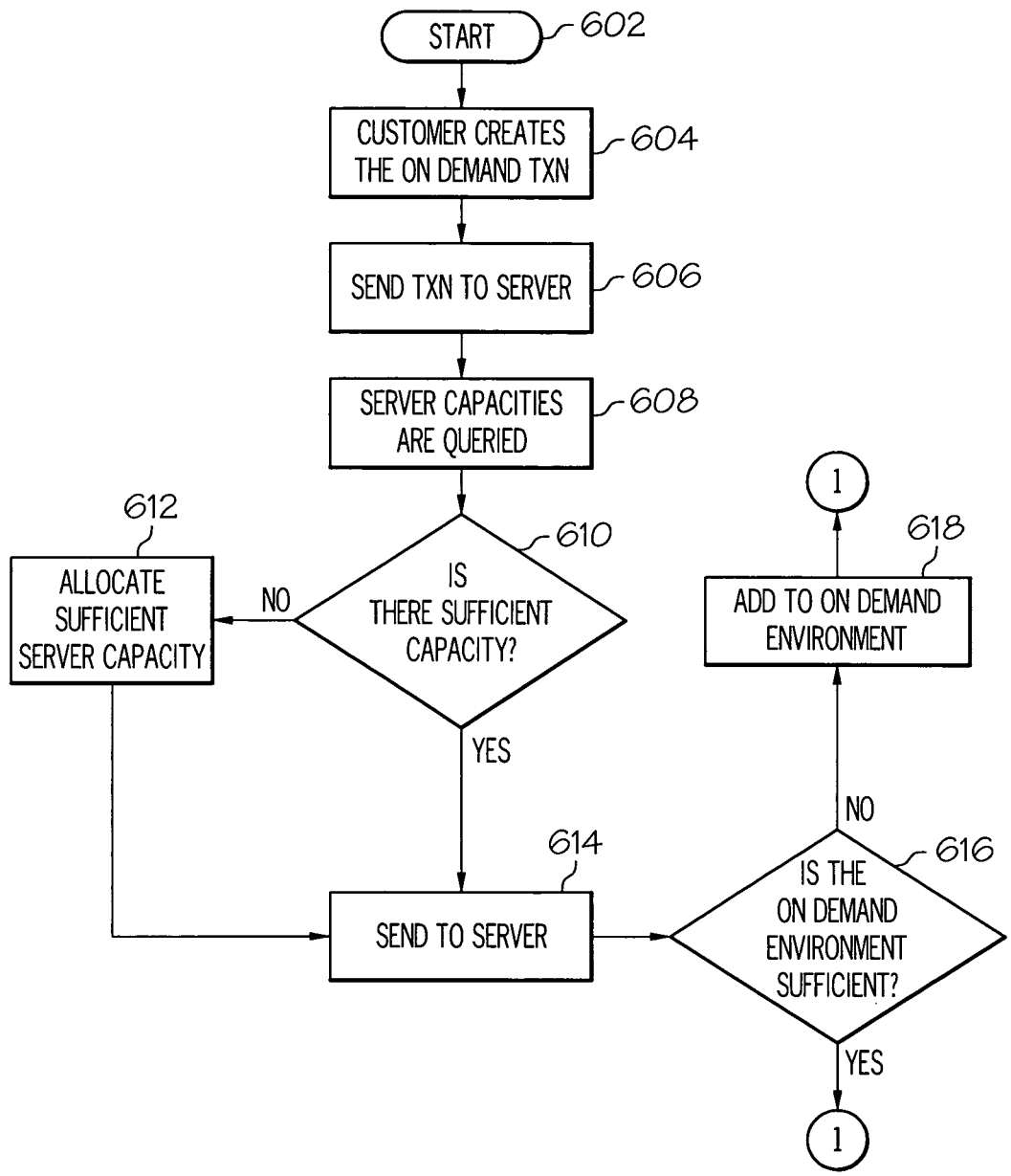
FIGS. 6a-b show a flow-chart showing steps taken to execute the steps shown and described in FIGS. 1-2 using an on-demand service provider.
Figure 6B:
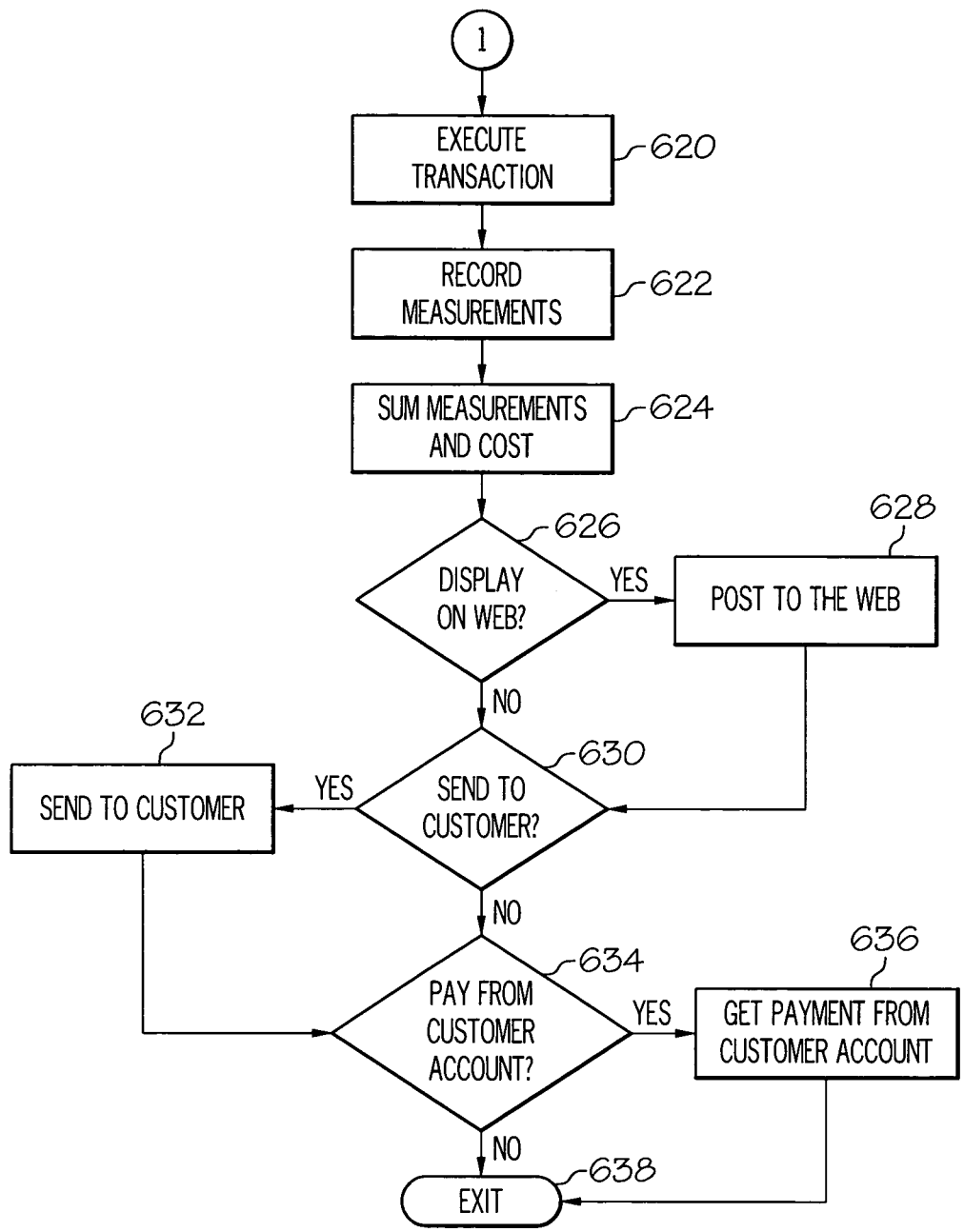

With reference now to FIGS. 6*a-b*, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

The present invention thus provides for a computer-implementable method, system and computer-usable medium for managing rules through the use of a configuration database. In one embodiment, the computer-implementable method includes the step of, in response to detecting a rule change, transmitting a new rule to a rule control logic in a resource management database, wherein the rule change changes a rule for an attribute of a resource in a data processing system, and wherein the resource management database describes attributes of resources in the data processing system. The computer-implementable method may further include the step of transmitting the new rule from the rule control logic to a resource manager, wherein the resource manager is a person who has the capacity to implement the new rule in a resource in the data processing system. In one embodiment, the resource management database is a Configuration Management Database (CMDB), and the computer-implementable method may further include the step of transmitting a watch message from the rule control logic to a Configuration Item (CI) in a CMDB, wherein the CI contains a shadow copy of attribute configurations for resources managed by the CMDB, and wherein the watch message instructs the CI to watch for a certification entry from the resource manager, and wherein the certification entry identifies the resource as being in compliance with the new rule. In addition, the computer-implementable method may include the steps of: in response to the resource manager implementing the new rule in the resource, receiving a certification entry in the CI indicating that the resource is in compliance with the new rule; transmitting a certification message from the CI to a certification control in the CMDB, wherein the certification message indicates that the resource is in compliance with the new rule; and transmitting a compliance summary from the certification control to an enterprise Information Systems (IS) manager, wherein the compliance summary describes a compliance status for multiple resources in the data processing system, and wherein the compliance status describes whether a resource has or has not implemented the new rule.

Note further that, as described above, instructions used in each embodiment of a computer-usable medium may be deployed from a service provider to a user. This deployment may be made in an "on-demand" basis as described herein.

While the present invention has been particularly shown and described with reference to a preferred embodiment, it will be understood by those skilled in the art that various changes in form and detail may be made therein without departing from the spirit and scope of the invention. For example, while the invention has been described as creating a new rule in response to a change to a CI rule and/or an enterprise's policy (as defined above), it should be understood that the new rule may be initially created in response to a change to an enterprise's policy or to a creation of a new enterprise policy. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method of managing resources in a data processing system, the computer-implementable method comprising:
   a processor unit, in response to detecting a rule change for an attribute of a resource in a data processing system, transmitting a new rule that reflects the rule change to a rule control logic in a resource management database, wherein the resource management database describes and controls attributes of resources in the data processing system;
   the processor unit transmitting the new rule from the rule control logic to a configuration property setting logic in the resource management database; and
   the processor unit transmitting the new rule from the configuration-property setting logic to the resource in the data processing system, wherein the resource automatically implements the new rule upon receiving the new rule from the configuration property setting logic.

2. The computer method of claim 1, wherein the new rule is created in response to a creation of a new enterprise policy for the resource, wherein the new enterprise policy is an enterprise directive from which the new rule is derived, and wherein the new rule creates software code that is executed by the resource to implement the new enterprise policy and the new rule on the resource.

3. The computer implemented method of claim 1, wherein the resource is a hardware resource in an enterprise's data processing system.

4. The computer implemented method of claim 1, further comprising:
   the processor unit providing a shadow copy of an updated configuration of the resource, wherein the updated configuration includes an implementation of the new rule in the resource.

5. The computer implemented method of claim 4, wherein the resource management database is a Configuration Management Database (CMDB), and wherein the computer-implementable method further comprises:
   the processor unit populating a certification logic with data from a configuration property in a Configuration Item (CI) in a CMDB, wherein the CI contains a shadow copy of attributes configured for the resource, and wherein the certification logic is part of the rule control logic.

6. The computer implemented method of claim 5, further comprising:
   the processor unit generating a certification report in the certification logic, wherein the certification report describes which CMDB-managed resources are compliant with the new rule and which CMDB-managed resources are not compliant with the new rule; and
   the processor unit transmitting the certification report to an enterprise's Information Systems (IS) manager.

7. The computer implemented method of claim 1, wherein the rule control logic controls which resources in a networked system of computers implement the new rule.

8. A system comprising:
   a processor;
   a data bus coupled to the processor;
   a memory coupled to the data bus; and
   a non-transitory computer-usable medium embodying computer program code, the computer program code comprising instructions executable by the processor and configured for:
   in response to detecting a rule change for an attribute of a resource in a data processing system, transmitting a new rule that reflects the rule change to a rule control logic in a resource management database, wherein the resource management database describes and controls attributes of resources in the data processing system;
   transmitting the new rule from the rule control logic to a configuration property setting logic in the resource management database; and
   transmitting the new rule from the configuration property setting logic to the resource in the data processing system, wherein the resource automatically implements the new rule upon receiving the new rule from the configuration property setting logic.

9. The system of claim 8, wherein the new rule is created in response to a creation of a new enterprise policy for the resource, wherein the new enterprise policy is an enterprise directive from which the new rule is derived, and wherein the new rule creates software code that is executed by the resource to implement the new enterprise policy and the new rule on the resource.

10. The system of claim 8, wherein the resource is a hardware resource in an enterprise's data processing system.

11. The system of claim 8, wherein the instructions are further configured for:
   providing a shadow copy of an updated configuration of the resource, wherein the updated configuration includes an implementation of the new rule in the resource.

12. The system of claim 8, wherein the resource management database is a Configuration Management Database (CMDB), and wherein the instructions are further configured for:
   populating a certification logic with data from a configuration property in a Configuration Item (CI) in a CMDB, wherein the CI contains a shadow copy of attributes configured for the resource, and wherein the certification logic is part of the rule control logic.

13. The system of claim 12, wherein the instructions are further configured for:
   generating a certification report in the certification logic, wherein the certification report describes which CMDB-managed resources are compliant with the new rule and which CMDB-managed resources are not compliant with the new rule; and
   transmitting the certification report to an enterprise's Information Systems (IS) manager.

14. A non-transitory computer readable storage device on which is stored computer program code, the computer program code comprising computer executable instructions configured for:
   in response to detecting a rule change for an attribute of a resource in a data processing system, transmitting a new rule that reflects the rule change to a rule control logic in a resource management database, wherein the resource management database describes and controls attributes of resources in the data processing system;

transmitting the new rule from the rule control logic to a configuration property setting logic in the resource management database; and transmitting the new rule from the configuration property setting logic to the resource in the data processing system, wherein the resource automatically implements the new rule upon receiving the new rule from the configuration property setting logic.

15. The computer readable storage device of claim 14, wherein the new rule is created in response to a creation of a new enterprise policy for the resource, wherein the new enterprise policy is an enterprise directive from which the new rule is derived, and wherein the new rule creates software code that is executed by the resource to implement the new enterprise policy and the new rule on the resource.

16. The computer readable storage device of claim 14, wherein the resource is a hardware resource in an enterprise's data processing system.

17. The computer usable medium computer readable storage device of claim 14, wherein the computer executable instructions are further configured for:

providing a shadow copy of an updated configuration of the resource, wherein the updated configuration includes an implementation of the new rule in the resource.

18. The computer readable storage device of claim 14, wherein the resource management database is a Configuration Management Database (CMDB), and wherein the computer executable instructions are further configured for:

populating a certification logic with data from a configuration property in a Configuration Item (CI) in a CMDB, wherein the CI contains a shadow copy of attributes configured for the resource, and wherein the certification logic is part of the rule control logic.

19. The computer usable medium computer readable storage device of claim 18, wherein the computer executable instructions are further configured for:

generating a certification report in the certification logic, wherein the certification report describes which CMDB-managed resources are compliant with the new rule and which CMDB-managed resources are not compliant with the new rule; and transmitting the certification report to an enterprise's Information Systems (IS) manager.

20. The computer readable storage device of claim 14, wherein the computer executable instructions are provided by a service provider to a customer on an on-demand basis.

* * * * *